United States Patent [19]

Rovesti et al.

[11] 3,893,911
[45] July 8, 1975

[54] DEMETALLIZATION OF HIGH METALS FEEDSTOCKS USING REGENERATED CATALYST

[75] Inventors: William C. Rovesti, Levittown, Pa.; Ronald H. Wolk, Trenton, N.J.

[73] Assignee: Hydrocarbon Research, Inc., New York, N.Y.

[22] Filed: June 24, 1974

[21] Appl. No.: 482,277

[52] U.S. Cl. ............ 208/251 H; 208/295; 208/296; 208/297; 208/89
[51] Int. Cl. ............................................ C10g 23/00
[58] Field of Search ....... 208/251 H, 253, 295, 296, 208/297, 89

[56] References Cited
UNITED STATES PATENTS

| | | | |
|---|---|---|---|
| 2,730,487 | 1/1956 | Bertram et al. | 208/253 |
| 2,987,467 | 6/1961 | Keith et al. | 208/251 |
| 2,987,470 | 6/1961 | Turken | 208/253 |
| 3,576,737 | 4/1971 | Mitchell | 208/251 H |
| 3,716,479 | 2/1973 | Weisz | 208/251 H |
| R25,770 | 4/1965 | Johanson | 208/10 |

*Primary Examiner*—Delbert E. Gantz
*Assistant Examiner*—Juanita M. Nelson

[57] ABSTRACT

The demetallization of petroleum feedstocks containing a high percentage of metal impurities, particularly vanadium, by ebullated bed catalytic hydrogenation is improved through an initial pretreatment of particulate activated porous aluminum oxide catalyst in a reaction zone wherein vanadium and carbon are deposited on the catalyst. Following such pretreatment, the used catalyst is removed from the reaction zone at an appropriate rate, regenerated by burnoff of substantially all the carbon, and then returned to the reaction zone. This use of regenerated catalyst results in the average demetallization activity of the catalyst in the reactor being higher for vanadium removal than if the used catalyst were all replaced with fresh catalyst.

While this invention may be used in a single stage ebullated bed reactor process, it is particularly useful as the first stage of a multiple stage ebullated bed hydrogenation reaction process in which a high activity desulfurization catalyst is used in a subsequent reaction stage for sulfur removal.

10 Claims, 4 Drawing Figures

DEMETALLIZATION OF HIGH METALS FEEDSTOCKS USING REGENERATED CATALYST

BACKGROUND OF THE INVENTION

U.S. Pat. No. Re. 25,770 to Johanson has disclosed an ebullated bed process for the hyrogenation of petroleum residuum hydrocarbon liquids to provide desulfurization or hydrocracking or both. As described therein the reactants of residuum and hydrogen pass upwardly through a reaction zone containing a particulate catalyst at a flow rate that places the catalyst in random motion in the liquid. The resulting contact between the residuum, the hydrogen and the catalyst produce superior hydrogenation at substantially isothermal conditions, with a minimum carryover of the catalyst from the reaction zone.

In the ebullated bed process, it is normal practice to replace catalyst on a continuous basis during regular operations. This is especially critical at high levels of demetallization or desulfurization with high metals-containing petroleum residuum such as those derived from Western Venezuelan crudes, since the catalyst is rapidly deactivated by the carbon as well as the metals deposited thereon.

The use of particulate porous activated alumina contact solids or catalyst material (Porocel) for removing oil-soluble metallo-organic impurities from petroleum residuum by contact in an ebullated bed reactor has been taught by U.S. Pat. No. 2,987,467 to Keith and U.S. Pat. No. 2,987,470 to Turken, with the latter showing regeneration of the catalyst and its return to the reactor. Although it has been disclosed in U.S. Pat. No. 3,576,737 to Mitchell that vanadium deposition applied to an aluminum oxide catalyst by solution impregnation benefits the activity of the catalyst for vanadium removal under certain circumstances, such vanadium impregnation by the catalyst manufacturer is expensive and improved procedures for vanadium removal from petroleum feedstocks are desired.

SUMMARY OF THE INVENTION

It has been unexpectedly discovered that the activity of porous activated alumina catalyst materials for demetallization of residuum and particularly for vanadium removal from certain petroleum residua is substantially improved by providing an initial deposition of vanadium on the catalyst during initial hydrogenation contact with metal-containing feedstocks in an ebullated bed reaction zone. The demetallization activity of the catalyst for vanadium removal first decreases rapidly to about 35–40 percent of its initial activity, temporarily stabilizes at that lower rate and then increases to about 50 percent of its initial level of activity for a catalyst age exceeding about 0.5 Bbl/lb, before finally deteriorating to an undesirable and unusuable level of activity. However, before such final deterioration in activity occurs, the catalyst material is removed incrementally from the reaction zone and regenerated, such as by burnoff of the carbon deposits using conventional means. The regenerated catalyst material is then incrementally returned to the reaction zone for further use at the same operating conditions as before. Again, an initial rapid loss in catalyst activity occurs, but in contrast to the situation using fresh catalyst the activity rate of the regenerated catalyst for vanadium removal rapidly reaches approximately the same stabilized level as the fresh catalyst material before regeneration, and without experiencing a period of reduced activity due to carbon redeposition on the sites previously uncovered by the carbon burn-off. Thus, the average activity of the regenerated catalyst will exceed the activity of the fresh untreated catalyst, apparently because the initial accumulation of at least about 0.5 wt. percent vanadium in the catalyst promotes further vanadium removal. A small portion of the used catalyst withdrawn from the reaction zone is discarded prior to the regeneration step and an equal portion of fresh catalyst is added to the reactor, all at a rate sufficient to limit total metals deposition on the catalyst to below about 20 wt. percent. Such autocatalytic phenomenon for the demetallization catalyst was unexpected, because the accumulation of carbon and vanadium in the pores of the activated alumina catalyst material would ordinarily be expected to severely deactivate this demetallization solid.

In summary, the basis of this invention is the operation of the ebullated bed demetallization reactor in such a way as to allow the vanadium to accumulate on the initial charge of fresh activated alumina or activated bauxite catalyst until the rate of vanadium removal stabilizes, before beginning continuous regeneration and replacement of the catalyst. In this way, the catalyst is allowed to reach its maximum practical demetallization rate, a situation that continuous replacement of catalyst from the beginning of operation would tend to counteract by maintaining the average rate of vanadium removal closer to its minimum level. Therefore, the necessity for operating the reaction zone at more severe hydrogenation conditions to attain a given rate of vanadium removal and the lower throughput or higher hydrogen consumption resulting from such a severe mode of operation would be eliminated. The improvement achieved by this invention is the substantial use of the regenerated used catalyst instead of all fresh catalyst for replacement in the reaction zone, thereby achieving a higher average catalytic activity for vanadium removal than if the used catalyst were replaced with fresh catalyst.

If desired, a second or subsequent stage reaction zone can be provided in series with the initial stage of demetallization reaction for further processing of the feed stream for desulfurization, wherein the catalyst used may be a high activity desulfurization catalyst material. The addition rate of fresh catalyst to the second stage reactor to replace used catalyst is selected so as to maintain its metallic poison loading below a maximum desired level such as 15 wt. % of vanadium and nickel (on a spent catalyst basis). The fresh catalyst addition will usually not exceed about 0.20 pound per barrel of residuum feed. The catalyst replacement rate will be determined by the desired percent desulfurization of the feed, and will usually vary between about 0.05 and 0.30 pound per barrel of feed for 75% or greater desulfurization. The desulfurization process in a second stage reaction zone is carried out at temperatures of 700°–850°F, hydrogen partial pressure of 1,000–3,000 psi, space velocity of 0.2–2.0 $V_f/hr/V_r$ (volume of feed per hour per volume of reactor), and hydrogen circulation rate of 3,000–8,000 SCF per barrel of liquid product.

DESCRIPTION OF THE PREFERRED EMBODIMENT

Figure 1:
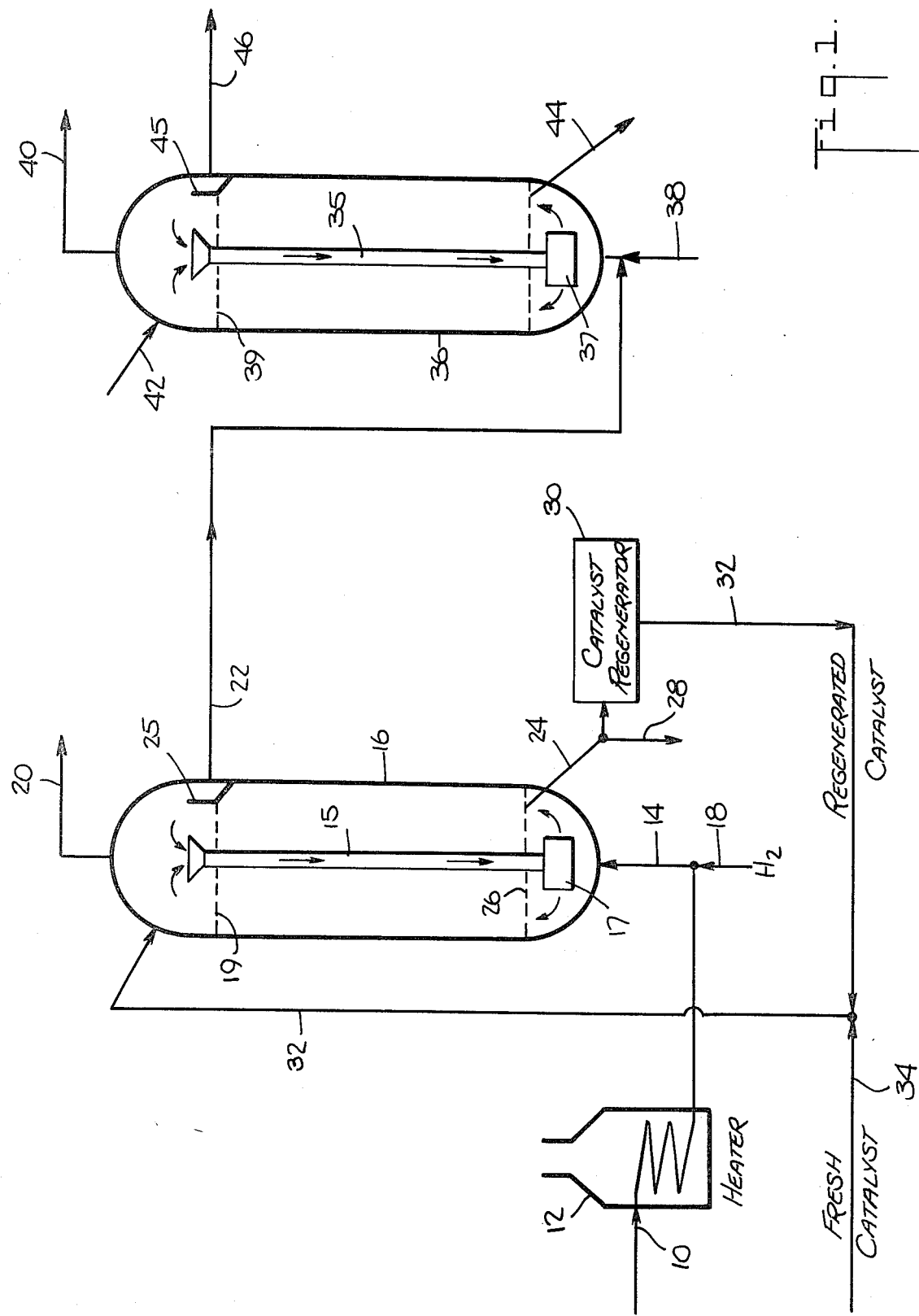
FIG. 1 is a schematic view of the major elements of an ebullated bed reaction process for the hydrogenation of petroleum residuum.

In accordance with the invention, a feed of a metals-containing petroleum residuum such as Lago Treco atmospheric bottoms or Laguna atmospheric residuum is appropriately pressurized and introduced to the system at 10. It is then heated to a desired temperature in heater 12 for entry through line 14 into reactor 16 containing particulate catalyst. Pressurized, warmed hydrogen is added at 18. Desired reactor operating conditions are 700°–850°F temperature and 1,000–3,000 psi hydrogen partial pressure.

With a controlled upward velocity of liquid and gas within reactor 16, the catalyst therein is placed in random motion with the bed of catalyst being expanded from its settled stage by 10 to 100 percent, and usually by about 50 percent. The upper level reached by the catalyst solids is indicated approximately at line 19. Desired space velocity is from 0.2 to 2.0 $V_f/hr/V_r$ and usually the hydrogen rich gas circulation rate is from 3,000 to 8,000 SCF per barrel and preferably about 3,500 to 5,000 SCF per barrel of liquid feed.

A recycle of liquid from above the upper level 19 of catalyst solids permits the return of essentially solids-free liquid to below the catalyst bed to provide an upflow of liquid and thereby maintain the catalyst in random motion in the liquid. As shown, this is accomplished by utilizing an internal draft tube 15 and circulation pump 17. However, external recirculation of the reactor liquid can alternatively be employed. The reactor liquid recycle rate is principally dependent upon the oil feed rate, hydrogen feed rate, reactor size, catalyst particle size, and reactor liquid viscosity affecting catalyst level and ebullation.

A gaseous effluent stream is removal from the reactor at 20 and a liquid effluent is removed at 22 from trap 25 located above level 19. These streams are subsequently suitably treated in a known manner to recover hydrogen from stream 20 and to separate and fractionate various liquid portions from stream 22.

Figure 2:
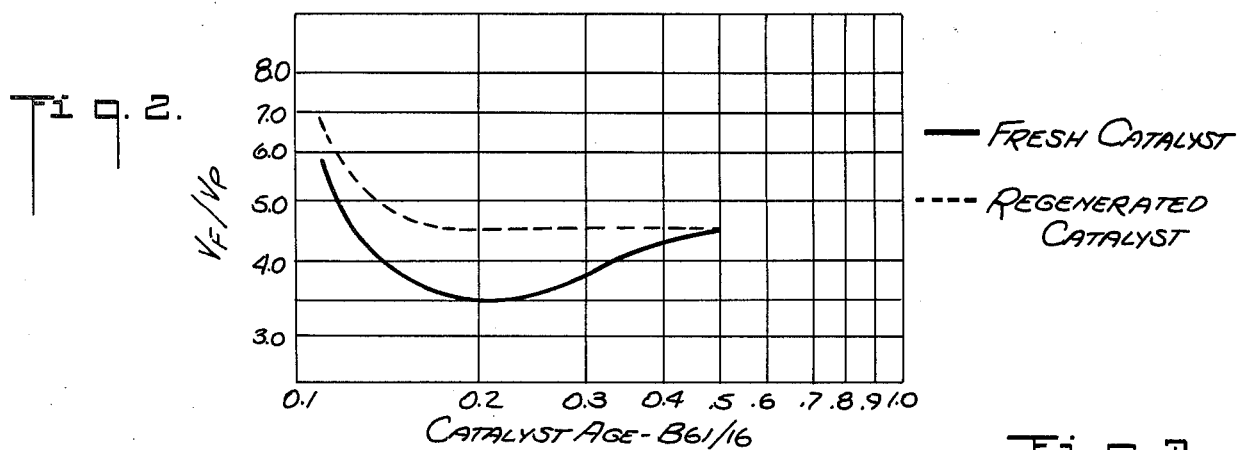
FIG. 2 is a graph showing typical demetallization activity of the catalyst vs. catalyst age before and after catalyst regeneration.

The initial charge of catalyst material is maintained in the reactor 16 until its demetallization activity passes through a minimum value and then stabilizes and it attains a catalyst age of at least about 0.3 bbl residuum/lb catalyst. During this period, the demetallization activity of the catalyst for vanadium removal will initially decline, as indicated by the lower solid curve of FIG. 2, and then increase to a relatively stabilized equilibrium level. After the catalyst achieves an age exceeding about 1.0 bbl/lb., the demetallization activity will then decline to an undesirable level due to further accumulation of carbon and metals, particularly vanadium, on the catalyst. However, it is an important feature of this invention that after the catalyst has achieved a relatively stabilized level of activity, it is continuously withdrawn from the reaction zone through line 24 from above the flow distributing deck 26. A small portion of this catalyst is discarded at 28, with the remainder being passed to the regeneration unit 30, which is of a standard type adapted to burn off and substantially remove the carbon deposits from the catalyst to less than about 2 weight percent carbon remaining. The regenerated catalyst is then returned to reactor 16 via line 32. While shown as entering the upper part of the reactor, this catalyst could be introduced into line 14. Fresh catalyst in an amount substantially equal to that discarded at 28 is added to line 32 through line 34. The amount of carbon-coated catalyst which is discarded and replaced with fresh catalyst is regulated so as to maintain the average vanadium loading on the catalyst in the reactor 16 at a desired equilibrium level, preferably not exceeding about 20 wt. percent. It has been found that the fresh catalyst added in combination with regenerated catalyst is usually less than one-half of that required when fresh catalyst alone is used in the reactor to achieve a particular percent demetallization.

If desired, the liquid effluent leaving pretreatment reaction zone 16 through line 22 may be passed to a catalytic desulfurization zone 36 for further processing, with supplemental hydrogen being added at 38. In a manner similar to the first reaction zone, the liquid and hydrogen pass upwardly through the desulfurization zone 36 at sufficient velocity to form an ebullated bed with a contact solids upper level at approximately 39. Similarly as in the first stage reactor, an upward flow of liquid is provided to maintain the random motion or ebullated flow of the catalyst particles, by employing internal draft tube 35 and circulation pump 37. However, external circulation of reactor liquid could be employed if desired.

Catalyst is added to the reaction zone as needed through line 42 and can be removed continuously or otherwise through line 44. The resulting effluent vapor is removed at 40, and a liquid product is removed at 46 from the trap tray 45 located above the solids upper level 39. The vapor 40 may be treated for recovery of light hydrocarbons and hydrogen, with the hydrogen being purified and recycled to the feed stream 14.

The desulfurization zone 36 is preferably operated at a temperature between 700° and 850°F and at a hydrogen partial pressure between 1,000 and 3,000 psig. In this reaction zone the space velocity may be between about 0.20 and 2.00 $V_f/hr/V_r$ and preferably in excess of 0.40 $V_f/hr/V_r$. A liquid effluent containing less than one percent sulfur is removed at 46 for further processing as desired to provide liquid product of lower sulfur content.

In the practice of the process of this invention, appreciable economics in catalyst use can be accomplished by the use in the first stage reaction zone of a particulate, activated bauxite contact solids. These solids contain at least about 75 percent alumina and from 7.5 to 22 weight percent of promoters of oxides of metals, including iron, titanium and silica. More particularly, a commercial product sold under the tradename "Porocel" by Minerals and Chemicals Corporation of America is preferred. This material has the following composition:

| | |
|---|---|
| $Al_2O_3$ | 72–76 wt. % |
| $Fe_2O_3$ | 10–18 wt. % |
| $TiO_2$ | 4 wt. % |

-Continued

SiO₂  5–9 wt. %
Insolubles  1 wt. %

While Porocel as above identified is preferred, the particulate contact solids in the first reaction zone can be selected from the group consisting of activated bauxite, porous aluminum oxide, or activated alumina promoted with a member selected from the group consisting of iron, titanium, silica, or oxides thereof and combinations thereof.

Any particulate hydrodesulfurization catalyst which is suitable for the desulfurization of petroleum residuum can be employed in the second stage reaction zone for this invention. Such catalyst can be selected from the group consisting of cobalt, molybdenum, nickel or oxides and sulfides thereof and mixtures thereof, and supported on a carrier selected from the group consisting of alumina, silica and mixtures thereof. Desirable examples of such catalyst materials include cobalt molybdate on alumina and nickel molybdate on alumina, with the former being preferred. The particulate catalyst material may comprise either extrudates of 0.030–0.065 inch diameter, or microspheres having a relatively narrow size fraction within the range of 30–270 mesh (U.S. Sieve Series). When the larger size extrudate shaped catalyst is used in the reactor, it should be understood that increased recirculation of the liquid within the reactor is required to maintain the ebullated bed conditions therein.

Thus, the essence of the present invention is that particulate porous activated aluminum oxide or bauxite, e.g., Porocel, which has been in use in a reactor and has accumulated at least about 0.5 wt. percent and preferably at least about 1.0 wt. percent vanadium on its surface, is a more effective demetallization catalyst than fresh porous aluminum oxide. This is a surprising result and provides for a more economical subsequent desulfurization step. As typically indicated by FIG. 2, the general demetallization curve for porous activated aluminum oxide shows catalyst deactivation until a catalyst age of about 0.2–0.3 B/Lb is reached for 140–400 ppm vanadium-containing feedstock. Thereafter, the catalyst activity begins to increase and an equilibrium level of activity is reached after about 0.4 B/Lb catalyst age. The importance of such initial vanadium deposition on the catalyst is typically shown by the upper dashed curve in FIG. 2, in that after the carbon is burned off the original catalyst and it is returned to the reactor, the demetallization level achieved is initially superior to the fresh catalyst. Also, the minimum region in the demetallization curve is avoided and the regenerated material equilibrates after about 0.2 B/Lb catalyst age.

This invention will be more fully understood by the following examples of operations which are intended for illustration only and are not to be contrued as limitative of the scope of the present invention.

EXAMPLE I

Two runs are made processing Lago Treco atmospheric residuum in a reactor containing porous activated bauxite (Porocel) catalyst. Conditions are as listed below:

TABLE I

| Feedstock: Lago Treco Atmospheric Residuum | | |
|---|---|---|
| °API, °F | | 17.5 |
| Sulfur, wt. % | | 2.16 |
| Vanadium, ppm | | 195 |
| Nickel, ppm | | 28 |
| Operating Conditions | Runs A & B | Runs C,D,& E |
| Catalyst | 12 × 20 mesh regular Porocel | Regenerated Porocel |
| Reactor temp., °F | 760 | 780 |
| H₂ partial pressure, psig | 2400 | 2000 |
| Space Velocity, V₀/hr/V_r | 0.45 | 1.0 |
| Space Velocity, Bbl/day/lb | 0.035 | 0.08 |
| Hydrogen circulation, SCF/hr | 4000 | 4000 |

Figure 3:
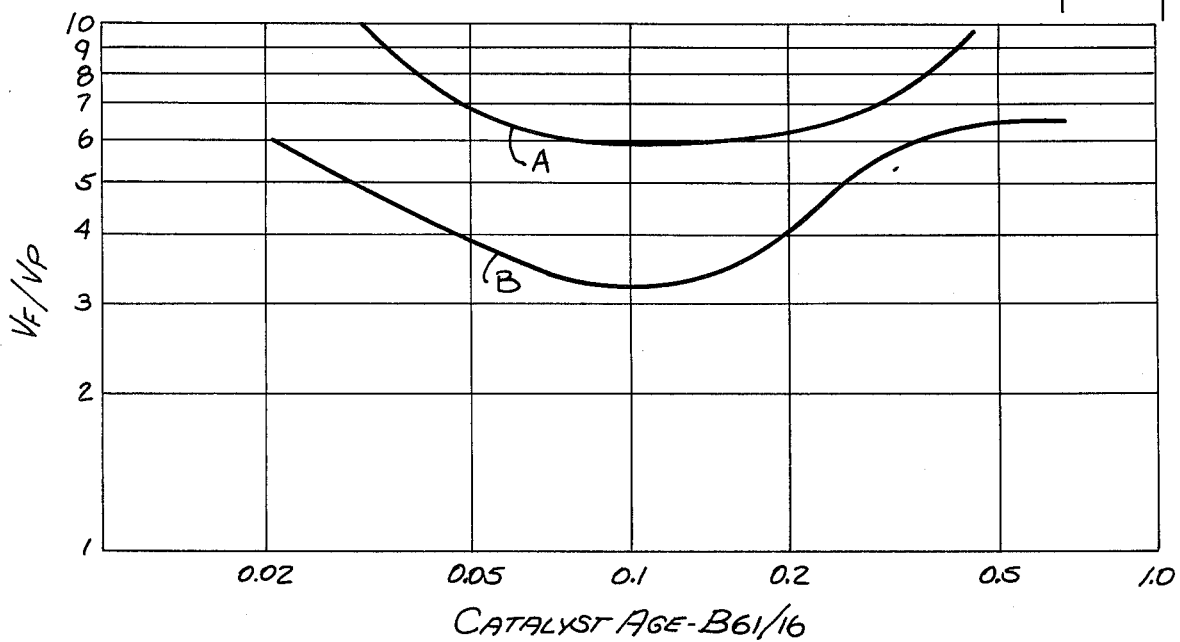
FIGS. 3 and 4 are graphs showing experimental results of demetallization activity vs. catalyst age achieved using the invention.

Run A is continued until 2 wt. % vanadium is deposited on the catalyst, and Run B is continued until 4 wt. % vanadium is deposited. Results are shown in FIG. 3. The vanadium removal activity $V_F/V_P$ for each run is seen to initially decline and pass through a minimum value, and then increase to a stabilized level as catalyst age is increased beyond about 0.3 Bbl/lb. (curves A & B).

EXAMPLE II

Figure 4:
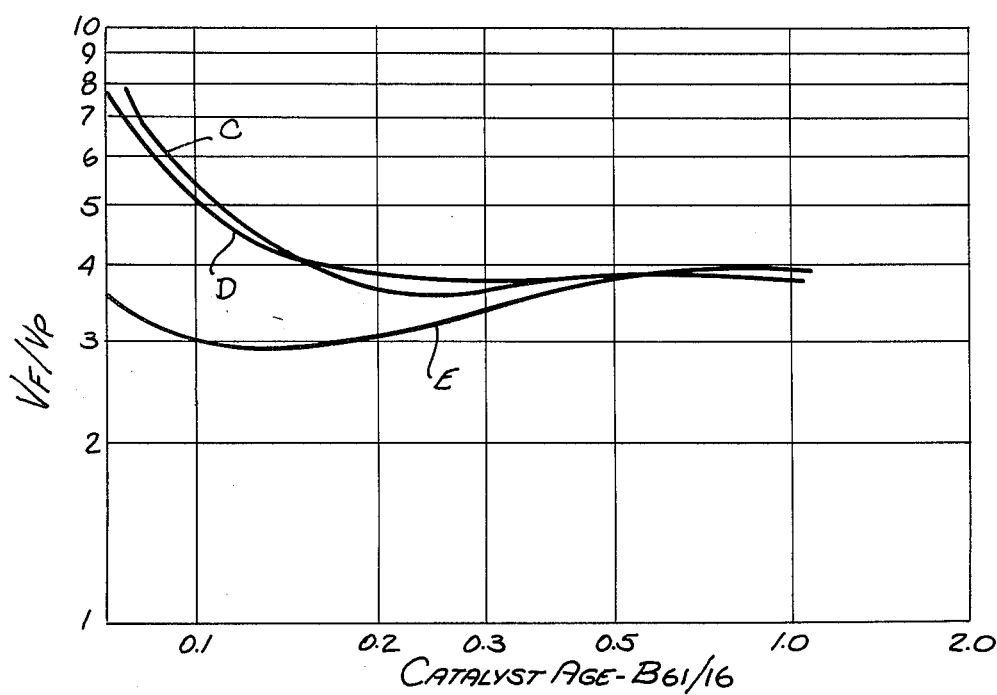

Next, both the used catalyst samples from Example I are regenerated by carbon burnoff in nitrogen-diluted air containing 1–2% O₂ at 1,000°F for about 4 hours until the carbon deposits are substantially all removed. These regenerated catalyst samples are then used in further demetallization hydrogenation operations with the same Lago Treco atmospheric residuum feed at substantially the same operating conditions as indicated in Table I for regenerated Porocel (Runs C & D). A comparison Run E is also made using fresh activated porous bauxite (Porcel) catalyst at the same operating conditions. Results of these three runs are shown in FIG. 4, where upper curves C & D show the regenerated catalyst activity for vanadium removal, while lower curve E shows the activity of the fresh Porocel catalyst for vanadium removal.

The vanadium removal activity, $V_F/V_P$, of the fresh Porocel catalyst sample (curve E) is seen to pass through the expected minimum value before increasing and stabilizing at a value of about 4. However, the vanadium removal activity of the two regenerated vanadium-loaded catalysts (upper curves C & D) is initially at a higher level of 7–8, then decreases rapidly and becomes stabilized at about the same level as for the fresh catalyst, but does not pass through a minimum value.

It is thus seen that the average activity of the two regenerated catalyst samples for vanadium removal is not only initially appreciably higher than for the fresh catalyst, but also becomes stabilized sooner, i.e., at lower catalyst age, than was observed for the fresh catalyst sample. This response pattern also indicates that there is a minimum vanadium loading necessary for the fresh porous aluminum oxide catalyst to reach its maximum activity for vanadium removal, and that this level is 1.5 to 2 wt. % vanadium loading.

While we have shown and described a preferred form of embodiment of this invention, it will be apparent to those skilled in this art that modifications may be made

We claim:

1. A method for demetallizing a petroleum residuum containing at least 10 ppm vanadium to obtain a product having at least 65% demetallization, wherein the residuum liquid and hydrogen are passed upwardly through a reaction zone containing a particulate catalyst at a rate sufficient to place the catalyst in random motion in the liquid but without substantial carryover of catalyst from the reaction zone and at conditions within the range of 1,000 to 3,000 psi hydrogen partial pressure, 700°–850°F temperature, and liquid space velocity of 0.2 to 2.0 $V_f/hr/V_r$, the improvement which comprises:
   a. maintaining an initial charge of particulate catalyst within the reaction zone until its demetallization activity passes through a minimum value then increases and stabilizes at a relatively constant level and the catalyst contains at least about 0.5 wt. % vanadium with catalyst age exceeding about 0.3 bbl/lb;
   b. then commencing withdrawal of used catalyst from the reaction zone at sufficient rate so as to maintain substantially the same stabilized demetallization activity level;
   c. regenerating the withdrawn used catalyst so as to substantially remove the carbon deposits therefrom and yet retain the vanadium deposits;
   d. returning the regenerated catalyst to the reaction zone at a rate approximately equal to the withdrawal rate so as to achieve a higher average vanadium removal activity in the reaction zone than by replacing the withdrawn used catalyst with fresh catalyst; and
   e. withdrawing a liquid product from the reaction zone that is at least about 65 percent demetallized.

2. The method of claim 1 wherein the particulate catalyst is activated bauxite.

3. The method of claim 1 wherein the catalyst is regenerated by burning off the carbon deposits by heating to about 1,000°F for at least 4 hours under 1–2% $O_2$ atmosphere.

4. The method of claim 1 wherein the liquid product is passed on to a succeeding ebullated bed catalytic reaction zone containing desulfurization catalyst material for achieving at least 75 percent desulfurization based on original feed.

5. A method for demetallizing a petroleum residuum containing at least 10 ppm vanadium to obtain a product having at least 65 percent demetallization, wherein the residuum liquid and hydrogen are passed upwardly through a reaction zone containing a particulate catalyst at a rate sufficient to place the catalyst in random motion in the liquid but without substantial carryover from the reaction zone and at conditions within the range of 1,000 to 3,000 psi hydrogen partial pressure, 700°–850°F temperature, and liquid space velocity of 0.2 to 2.0 $V_f/hr/V_r$, the improvement which comprises:
   a. maintaining an initial charge of particulate catalyst within the reaction zone until it contains at least about 0.5 wt. percent vanadium deposited thereon and its demetallization activity has stabilized at a relatively constant level with increasing catalyst age exceeding about 0.3 bbl/lb;
   b. withdrawing the used catalyst from the reaction zone at a sufficient rate so as to substantially maintain its demetallization activity level;
   c. discarding a small portion of the withdrawn catalyst;
   d. regenerating the remaining withdrawn used catalyst so as to substantially remove the carbon deposits and yet retain the vanadium deposits;
   e. returning the regenerated catalyst to the reaction zone at a rate approximately equal to the withdrawal rate so as to achieve a higher average vanadium removal activity in the reaction zone than would be achieved by replacing all the used catalyst with fresh catalyst;
   f. adding fresh catalyst to the reaction zone in amount substantially equal to the catalyst discarded; and
   g. withdrawing a liquid product from the reaction zone that is at least about 65 percent demetallized.

6. The method of claim 5 wherein the catalyst discarded is replaced at a rate below about 2.0 lb/bbl. feed so as to limit the vanadium deposition thereon to about 20 wt. percent vanadium.

7. The method of claim 5, wherein the feed stream is Lago Treco atmospheric residuum, the fresh catalyst addition rate is maintained below about 0.50 pound per barrel of feed and the vanadium loading on the used catalyst is maintained below about 10 wt. percent.

8. The method of claim 5 wherein the liquid product is passed to a succeeding ebullated bed catalytic reaction zone containing a desulfurization catalyst material for achieving at least 75 percent desulfurization based on original feed.

9. The method of claim 8 wherein the catalyst material in the second stage reaction zone is cobalt molybdate on alumina.

10. A method for demetallizing a petroleum residuum containing at least about 10 ppm vanadium, wherein the residuum and hydrogen are passed upwardly through a reaction zone containing a particulate catalyst at a rate sufficient to place the catalyst in random motion in the liquid but without substantial carryover from the reaction zone and at conditions within the range of 1,000 to 3,000 psi hydrogen partial pressure, 700°–850°F temperature and liquid space velocity of 0.2 to 2.0 $V_f/hr/V_r$, wherein a minor portion of the catalyst bed comprises fresh catalyst for which the activity for vanadium removal initially decreases to below a stabilized value of $V_F/V_P$ between 3 to 6 and then increases to said stabilized value; a major portion of the catalyst bed comprises regenerated used catalyst for which the activity for vanadium removal declines and stabilizes at a level substantially the same as for the fresh catalyst; and the vanadium content of the feedstream is reduced by at least about 65 wt. percent.

* * * * *